(12) United States Patent
Yamaguchi (10) Patent No.: US 9,152,034 B2
(45) Date of Patent: Oct. 6, 2015

(54) IMAGE DISPLAY APPARATUS FOR DISPLAYING THREE-DIMENSIONAL IMAGE AND HAVING A PHASE DIFFERENCE PLATE

(75) Inventor: Yutaka Yamaguchi, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 385 days.

(21) Appl. No.: 13/330,760

(22) Filed: Dec. 20, 2011

(65) Prior Publication Data

US 2012/0162609 A1 Jun. 28, 2012

(30) Foreign Application Priority Data

Dec. 27, 2010 (JP) .................... 2010-290326

(51) Int. Cl.
*G03B 35/26* (2006.01)
*G02B 27/26* (2006.01)
*G03B 21/14* (2006.01)
*H04N 9/31* (2006.01)
*G02B 27/22* (2006.01)

(52) U.S. Cl.
CPC ............. *G03B 35/26* (2013.01); *G02B 27/26* (2013.01); *G03B 21/14* (2013.01); *H04N 9/3167* (2013.01); *G02B 27/2207* (2013.01); *G02B 27/2228* (2013.01); *G02B 27/2264* (2013.01)

(58) Field of Classification Search
CPC ............ G02B 27/26; G02B 27/2264; G02B 27/2207; G02B 27/2228; G03B 35/26
USPC ........... 353/6, 7, 8, 9; 348/40, 41, 42, 43, 45, 348/46, 47, 48, 49, 50, 51, 52, 53, 54, 55, 348/56, 57, 58, 59, 60; 359/462, 463, 464, 359/465, 466, 467, 468, 469, 470, 471, 472, 359/473, 474, 475, 476, 477
See application file for complete search history.

(56) References Cited

U.S. PATENT DOCUMENTS 5,552,840 A * 9/1996 Ishii et al. ............. 348/751
5,921,650 A * 7/1999 Doany et al. ............ 353/31
6,547,396 B1 * 4/2003 Svardal et al. ............ 353/8

(Continued)

FOREIGN PATENT DOCUMENTS

JP 2004-354935 A 12/2004
JP 2009-122430 A 6/2009
JP 2009-180999 A 8/2009

OTHER PUBLICATIONS

Japanese Office Action for corresponding JP2010-290326, dated Aug. 19, 2014.

*Primary Examiner* — Bao-Luan Le
(74) *Attorney, Agent, or Firm* — Rossi, Kimms & McDowell LLP (57) ABSTRACT

An image display apparatus includes an image display element configured to modulate incident light from a light source, a polarization splitting element that has characteristics of transmitting first polarized light and reflecting second polarized light different from the first polarized light and that is configured to synthesize image light from the image display element to be introduced into a projection optical system, and a phase difference plate that is disposed at a side of the projection optical system relative to the polarization splitting element. The phase difference plate has an optic axis in a direction different from a surface normal direction and an in-plane direction of the phase difference plate.

12 Claims, 8 Drawing Sheets

(56) References Cited

U.S. PATENT DOCUMENTS

| | | |
|---|---|---|
| 6,736,514 B2 * | 5/2004 | Horvath et al. ................ 353/31 |
| 6,793,341 B2 * | 9/2004 | Svardal et al. .................... 353/8 |
| 6,899,429 B2 * | 5/2005 | Hamada et al. ................ 353/20 |
| 6,943,949 B2 * | 9/2005 | Sedlmayr ................ 359/487.04 |
| 7,040,760 B2 * | 5/2006 | Nakanishi et al. ............. 353/20 |
| 7,204,592 B2 * | 4/2007 | O'Donnell et al. ............... 353/7 |
| 7,528,906 B2 * | 5/2009 | Robinson et al. ............... 349/96 |
| 2005/0012904 A1 * | 1/2005 | Kim et al. ...................... 353/31 |
| 2005/0017938 A1 * | 1/2005 | O'Donnell et al. ............. 345/88 |
| 2006/0290889 A1 * | 12/2006 | Robinson et al. ................ 353/8 |
| 2006/0291053 A1 * | 12/2006 | Robinson et al. ............. 359/465 |
| 2009/0091709 A1 * | 4/2009 | Chien et al. ....................... 353/8 |
| 2009/0096991 A1 * | 4/2009 | Chien et al. ....................... 353/8 |
| 2010/0277577 A1 * | 11/2010 | Cowan et al. .................... 348/58 |
| 2011/0222022 A1 * | 9/2011 | Sato ................................ 353/20 |

* cited by examiner

IMAGE DISPLAY APPARATUS FOR DISPLAYING THREE-DIMENSIONAL IMAGE AND HAVING A PHASE DIFFERENCE PLATE

BACKGROUND OF THE INVENTION

1. Field of the Invention

The present invention relates to an image display apparatus, and more particularly to a projection image display apparatus that displays a three-dimensional image.

2. Description of the Related Art

Recently, a liquid crystal projector (a projection image display apparatus) that displays a three-dimensional image using polarized lights orthogonal to each other is proposed. This liquid crystal projector simultaneously projects images for the right and left eyes on the same screen in polarization states different from each other. A user observes the images so as to enter the respective eyes using an analyzer such as a polarization plate or a circular polarization plate to be able to observe the three-dimensional image.

Japanese Patent Laid-Open No. 2009-122430 discloses a liquid crystal projector that displays a three-dimensional image by disposing image display elements for the right and left eyes in one liquid crystal projector to illuminate these image display elements using polarized lights different from each other to synthesize and projects each image light by a polarization splitting element.

However, in the liquid crystal projector disclosed in Japanese Patent Laid-Open No. 2009-122430, an analyzing axis of a polarization plate and a polarizing axis of the image may be shifted from each other. The polarizing axis means a direction of vibration of linear polarized light or a direction of an elliptical long axis of elliptical polarized light. When the analyzing axis of the polarization plate and the polarizing axis of the image are shifted from each other, a phenomenon in which a certain image for the right eye enters the left eye and a certain image for the left eye enters the right eye, which is called crosstalk, is generated. As a result, the quality of the three-dimensional image is deteriorated and therefore it is difficult for the user to obtain a three-dimensional appearance. Particularly in a liquid crystal projector using a prism-type polarization splitting element, the crosstalk is generated depending on intensity or an incidence azimuth of a light beam that enters the polarization splitting element and therefore the quality of a display image may be significantly deteriorated.

SUMMARY OF THE INVENTION

The present invention provides an image display apparatus that displays a high-quality three-dimensional image while reducing a crosstalk without damaging luminance.

An image display apparatus as one aspect of the present invention includes an image display element configured to modulate incident light from a light source, a polarization splitting element that has characteristics of transmitting first polarized light and reflecting second polarized light different from the first polarized light and that is configured to synthesize image light from the image display element to be introduced into a projection optical system, and a phase difference plate that is disposed at a side of the projection optical system relative to the polarization splitting element. The phase difference plate has an optic axis in a direction different from a surface normal direction and an in-plane direction of the phase difference plate.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Embodiment 1

Figure 1:
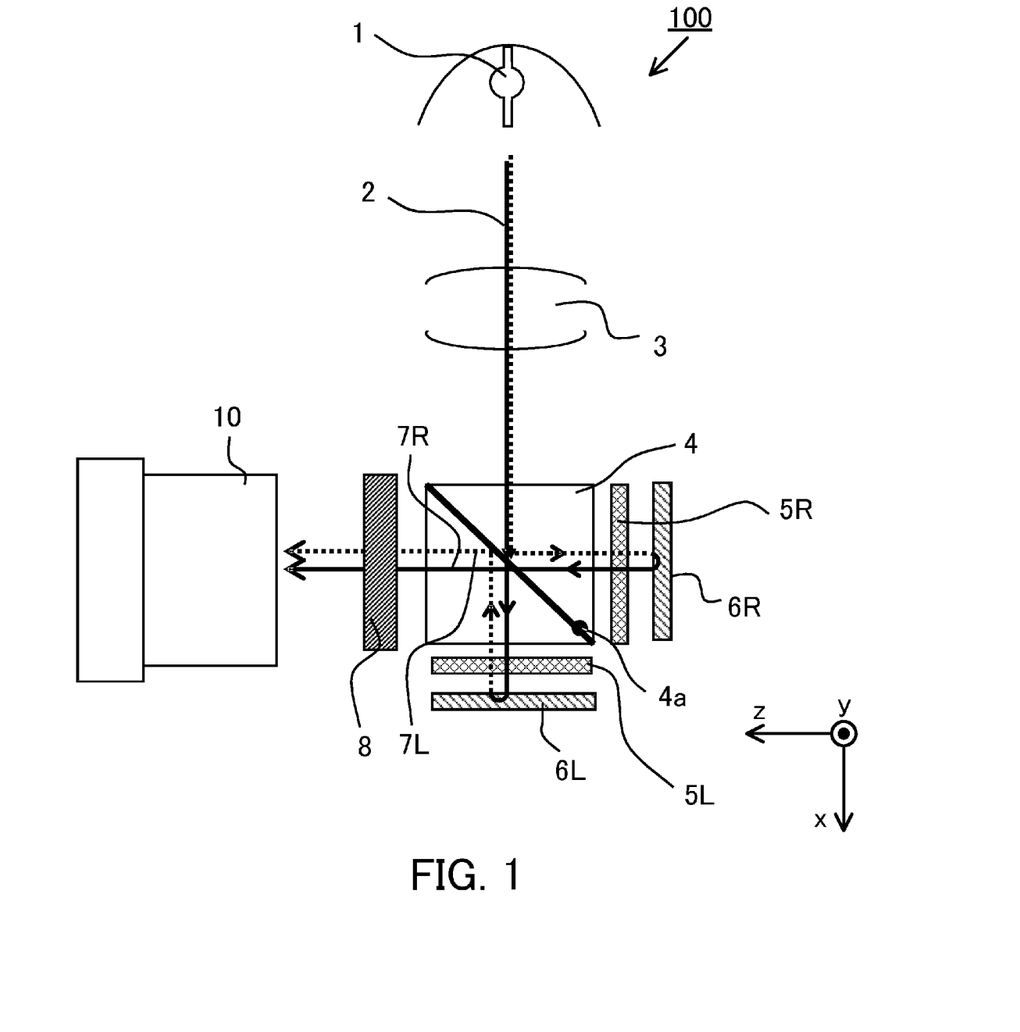
FIG. 1 is a schematic configuration diagram of an image display apparatus in Embodiment 1.

First of all, a projection image display apparatus (an image display apparatus) in Embodiment 1 of the present invention will be described. FIG. 1 is a schematic configuration diagram of a projection image display apparatus 100 (a reflective liquid crystal projection apparatus) in the present embodiment. The projection image display apparatus 100 is configured by including a light source 1, an illumination optical system 3, a polarization splitting element 4, phase difference plates 5R and 5L, image display elements 6R and 6L (reflective image display elements), a phase difference plate 8, and a projection optical system 10. The projection image display apparatus 100 uses polarization components different from each other to generate images for the left eye and the right eye to display a three-dimensional image.

An illumination light beam 2 that is illuminated from the light source 1 passes through the illumination optical system 3 to enter the polarization splitting element 4. The polarization splitting element 4 transmits through one polarized light (first polarized light, for example P-polarized light) of incident light beams that are emitted from the light from the light source 1, and it reflects the other polarized light (second polarized light, for example S-polarized light) that is orthogonal to the first polarized light in a direction (z-axis direction) that is different from an incident direction (x-axis direction). As the polarization splitting element 4 in the present embodiment, for example a polarizing beam splitter (PBS) that transmits or reflects the P-polarized light or the S-polarized light is used. In the present embodiment, the polarized light that transmits through the polarization splitting element 4 is referred to as L-polarized light, and the polarized light that is reflected on the polarization splitting element 4 is referred to as R-polarized light. The L-polarized light passes through the phase difference plate 5L and then enters the image display element 6L. The R-polarized light passes through the phase difference plate 5R and then enters the image display element 6R. The phase difference plates 5R and 5L correct a phase shift that is generated by the image display elements 6R and 6R or the polarization splitting element 4. The image display element 6L modulates and reflects the first polarized light that transmits through the polarization splitting element 4. The image display element 6R modulates and reflects the second polarized light that is reflected on the polarization splitting element 4. Thus, the image display elements 6R and 6L change a polarization state in accordance with a display image of the incident light to reflect it as image light.

The image lights that are reflected on the image display elements 6R and 6L enter the polarization splitting element 4 again. The image light that is reflected on the image display element 6R transmits through the polarization splitting element 4, and the image light that is reflected on the image display element 6L is reflected on the polarization splitting element 4. Thus, the two image lights that have polarization states orthogonal to each other are synthesized to head in one direction (z-axis direction). In the present embodiment, the polarization splitting element 4 has both functions of the separation and the synthesis of the incident polarized lights, but the characteristics are the same and the polarization splitting element may have any one of the functions.

Synthesized image lights 7R and 7L enter the projection optical system 10 via the phase difference plate 8 to be projected onto a screen. Thus, the projection optical system 10 projects the image lights that are obtained from the image display elements 6R and 6L via the polarization splitting element 4. In this case, for example, the projection optical system 10 displays the image that is displayed by the image display element 6R as an image for the right eye and the image that is displayed by the image display element 6L as an image for the left eye on the screen. Then, an appropriate analyzer is used to introduce each of the image lights to each of eyes of a user to be able to observe the three-dimensional image.

As illustrated in FIG. 1, in the projection image display apparatus 100, the phase difference plate 8 is disposed near a surface (an emission surface) at a side facing the projection optical system 10 of incident and emission surfaces of the polarization splitting element 4. In other words, the phase difference plate 8 is disposed between the polarization splitting element 4 and the projection optical system 10. The phase difference plate 8 is disposed so that its main surface is parallel to the emission surface of the polarization splitting element 4. The phase difference plate 8 also has an optic axis that is inclined with respect to a surface normal (a normal of the main surface of the phase difference plate 8). In other words, the phase difference plate 8 has an optic axis in a direction that is different from a surface normal direction and an in-plane direction (a direction in the main surface of the phase difference plate 8) of the phase difference plate 8. Therefore, the phase difference plate 8 is different from a common wave plate that has an optic axis facing the in-plane direction or the surface normal direction. The phase difference plate 8 compensates a shift of the polarizing axis that is generated in performing the polarization split or the synthesis of the ray obliquely incident on the polarization splitting element 4 to reduce the crosstalk that is generated in displaying the three-dimensional image. Hereinafter, its principle will be described in detail.

Figure 2A:
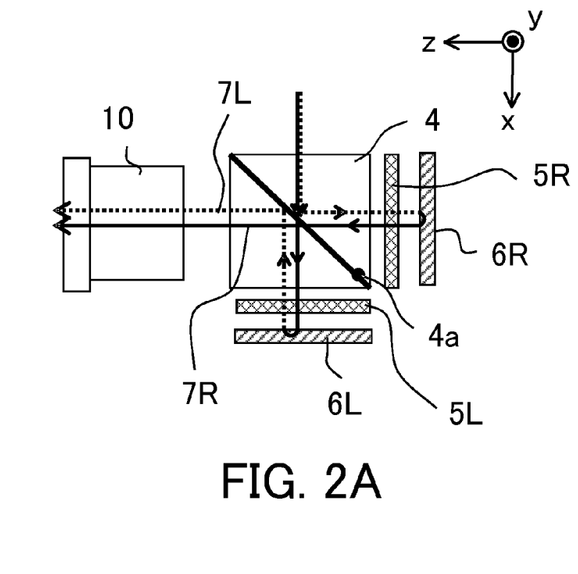
FIGS. 2A to 2D are diagrams of illustrating an observation model of a three-dimensional image in a conventional art.

First of all, referring to FIGS. 2A to 2D, the reason that the crosstalk is generated in displaying the three-dimensional image in a conventional configuration where the phase difference plate 8 does not exist is described. FIG. 2A is a schematic diagram of illustrating an area around the polarization splitting element 4 and the projection optical system 10 in the conventional configuration. The image light for the right eye 7R and the image light for the left eye 7L that have been modulated by the image display elements 6R and 6L are synthesized by the polarization splitting element 4 to be projected by the projection optical system 10. In FIG. 2A, the ray is indicated by one straight line, but generally projected light is a light beam that emits with a certain solid angle around the z-axis direction. The state of the polarization is different in accordance with an incidence angle or an incidence azimuth.

Figure 2B:
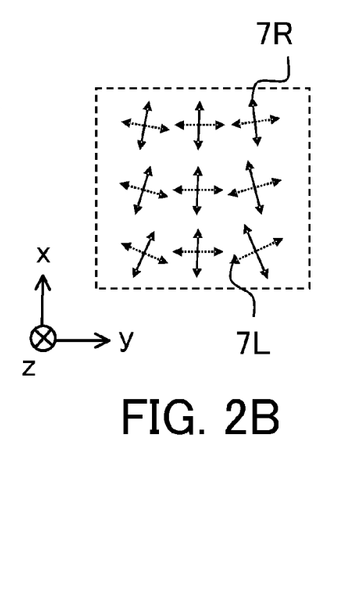

FIG. 2B is a diagram of illustrating a difference of a direction of the polarizing axis in accordance with an emission angle of the projected image light. The direction of the polarizing axis means a direction of vibration of a linear polarization or a direction of an elliptical long axis of an elliptical polarization. In FIG. 2B, nine combinations of arrows indicate directions of the polarizing axes in various emission azimuths of the light lights 7R and 7L. The combination of arrows that is located at a center of the nine combinations of arrows indicates a polarization state of the ray that travels in parallel to the z-axis, and the combinations of arrows that are located at the periphery indicate polarization states when the ray is incident obliquely with respect to the z-axis from various azimuths. The combination of the arrows that is located at the center, i.e. the polarizing axis of the image lights 7R and 7L that emits in parallel to the z-axis, is in a polarization state that is substantially parallel to the x-axis or the y-axis. On the other hand, the combinations of arrows at the periphery, i.e. the polarizing axes of the image light that emits with an angle with respect to the z-axis are inclined with reference to the x-axis or the y-axis.

Figure 3:
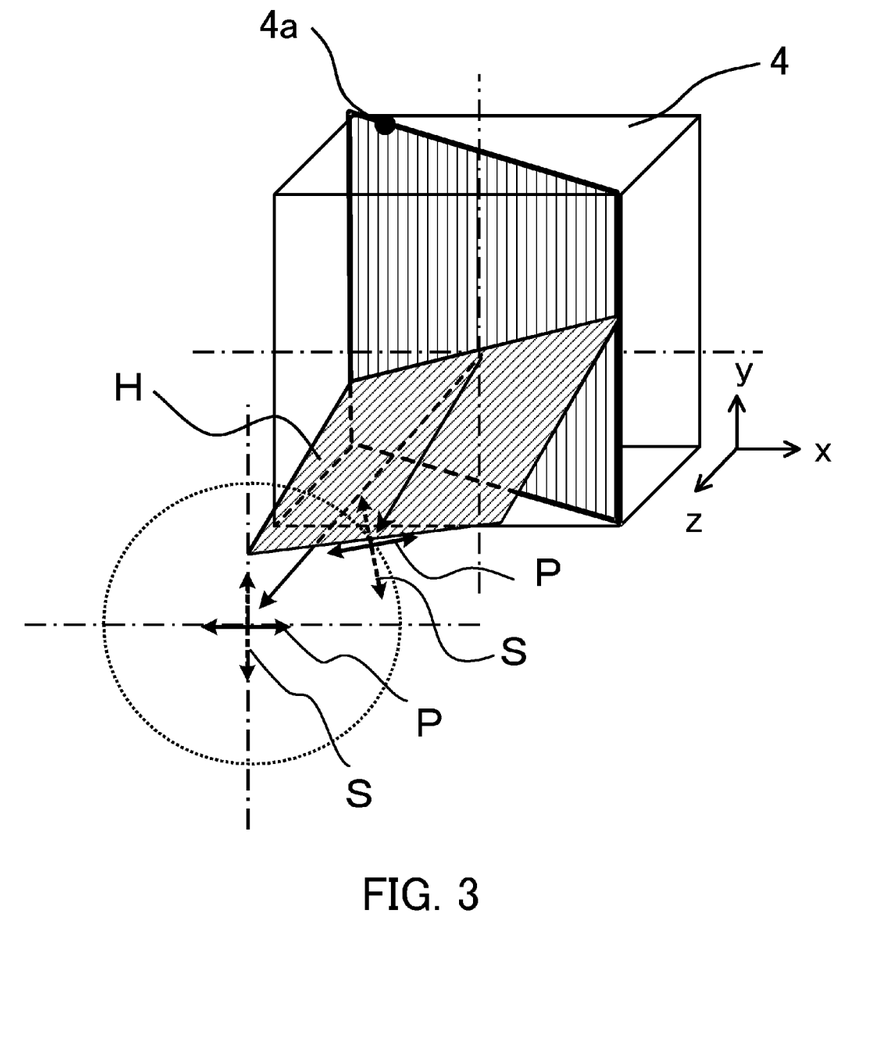
FIG. 3 is a diagram of describing an inclination of a polarizing axis at the time of polarization split or synthesizing a ray.

Subsequently, referring to FIG. 3, behaviors of the polarized lights at the time of oblique incidence are described. FIG. 3 is a diagram of describing the inclination of the polarizing axis in performing the polarization split or the synthesis of the ray, which illustrates a ray that is incident in parallel the z-axis direction and a ray that is obliquely incident from a certain azimuth that other than the z-axis direction. The polarization splitting element is an element that splits the ray that enters the polarization splitting surface 4a into the P-polarized light and the S-polarized light. Vibrating directions of the P-polarized light and the S-polarized light are determined by the relation between the polarization splitting surface 4a and the incident ray. An incident plane with respect to the ray that is incident in parallel to the z-axis is an xz-plane, and the P-polarized light is parallel to the x-axis and the S-polarized light is parallel to the y-axis. On the other hand, in the oblique incidence, an incident plane H of the P-polarized light and the S-polarized light is inclined with respect to the xz-plane as illustrated in FIG. 3. As a result, in a region where the incidence angle is especially large, the light is projected onto the screen in a state where the polarizing axis is inclined.

Figure 2C:
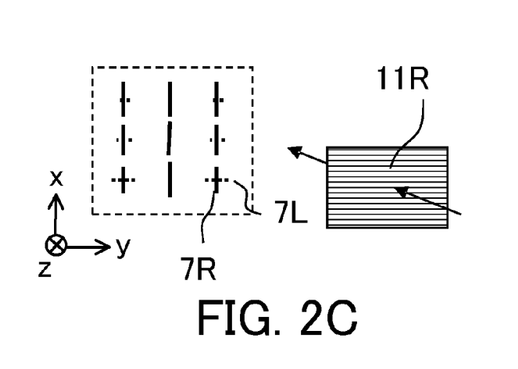
Figure 2D:
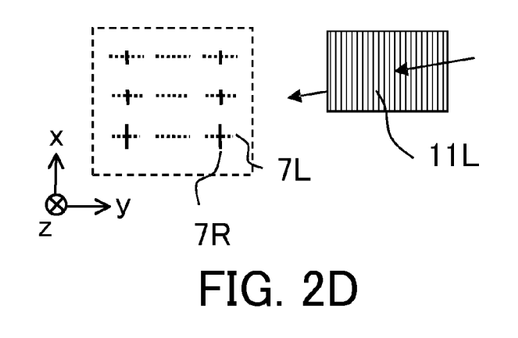

The user uses different analyzers for the right and left eyes, for example, a polarizing plate 11R that transmits a polarized light parallel to the x-axis and a polarizing plate 11L that transmits a polarized light parallel to the y-axis to observe the image light of the state illustrated in FIG. 2B. In this case, the image light for the left eye 7L of the polarized lights that enter the polarizing plate 11R is removed by the polarizing plate 11R, and the image light for the right eye 7R of the polarized lights that enter the polarizing plate 11L is removed by the polarizing plate 11L. As a result, images corresponding to respective eyes can be introduced into the respective eyes, and the user can observe the three-dimensional image. However, the ray that is substantially parallel to the z-axis can be analyzed with high accuracy, but for the light in a region where the incidence angle is large, the polarizing plates 11R and 11L cannot cut the other images sufficiently. Therefore, as illustrated in FIG. 2C, the image light 7L is mixed when only the image light 7R needs to be introduced. Similarly, as illustrated in FIG. 2D, the image light 7R is mixed when only the image light 7L needs to be introduced. As a result, the split of the images that correspond to the right and left eyes are not sufficient, and the quality of the displayed three-dimensional image is deteriorated.

When the polarizing plate that cuts one polarized light is inserted for removing one unnecessary polarized light for example on conditions that the right and left images are synthesized using the polarization splitting element 4 in one projection image display apparatus 100 that has the above configuration, the image light that has the same polarized light as that is also removed. Therefore, the configuration in which only the unnecessary light at an obliquely incident portion is removed simply using the polarizing plate cannot be adopted.

Figure 4A:
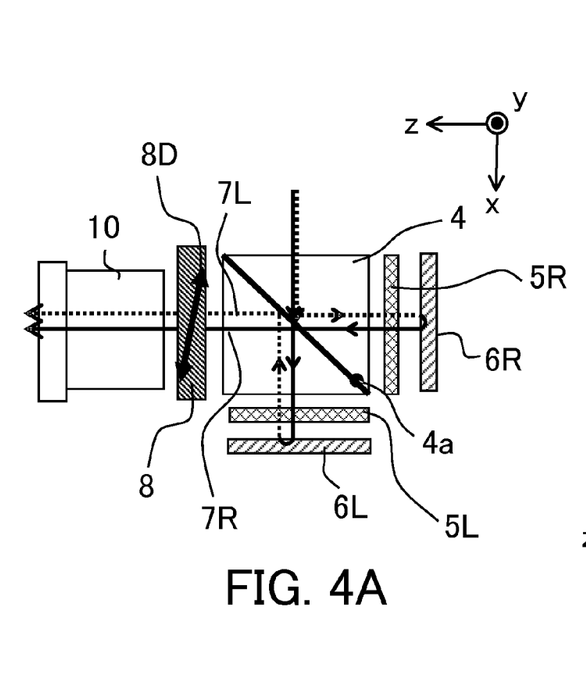
FIGS. 4A to 4D are diagrams of illustrating an observation model of a three-dimensional image in Embodiment 1.
Figure 4B:
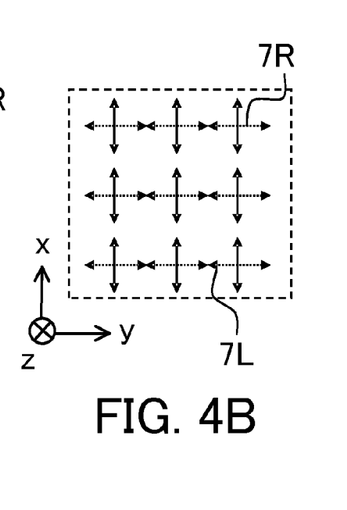

In the present embodiment, as illustrated in FIG. 4A, the phase difference plate 8 is disposed between the polarization splitting element 4 and the projection optical system 10. The phase difference plate 8 has an optic axis 8D that is inclined with respect to a surface normal (a normal of a main surface of the phase difference plate 8). Since the optic axis 8D of the phase difference plate 8 is inclined with respect to an xy plane, a phase difference changes in accordance with an angle or an azimuth of a ray that enters the phase difference plate 8. In the present embodiment, an inclination angle of the optic axis 8D of the phase difference plate 8 is appropriately selected in accordance with an asymmetric shift of the polarizing axis that is generated when the polarization split occurs on the polarization splitting surface 4a. Therefore, the inclination of the polarizing axis that is generated in the polarization split described above can be corrected in accordance with the incidence angle or the incidence azimuth.

It is preferred that the phase difference plate 8 be configured so that the angle (the acute angle) between the optic axis 8D and the surface normal is set in a range of 55 degrees to 75 degrees. It is more preferred that the angle be set in a range of 60 degrees to 70 degrees. In addition, it is preferred that a direction of the optic axis 8D be arranged in parallel to a plane (the xz plane in the drawing) that includes a normal direction of the polarization splitting surface 4a and the surface normal (the z-axis direction) of the phase difference plate 8. Such an arrangement enables the phase difference plate 8 to maintain the symmetry with respect to the polarization splitting surface 4a to perform an appropriate correction.

Furthermore, it is preferred that the phase difference plate 8 be selected so as to provide a phase difference of a nearly half wavelength for the polarized light that vertically enters the main surface (the substrate surface). It is preferred that a wavelength λ in which the phase difference of a half wavelength is obtained be selected so as to be a certain wavelength in a wavelength band of an incidence ray. The nearly half wavelength includes not only an exact half wavelength but also a wavelength that can be evaluated as a substantially half wavelength, and the effect of the present embodiment can be obtained even when such wavelengths are used. In the phase difference plate 8, a product of a difference Δ of a refractive index anisotropy of the phase difference plate 8 and a thickness d of an anisotropic medium of the phase difference plate 8 is defined as a phase difference Δn·d for a center wavelength λ of the wavelength band of the light that transmits through the phase difference plate 8. In this case, it is preferred that the phase difference Δn·d be set in a range of 0.35λ to 0.65λ. It is more preferred that the phase difference Δn·d be set in a range of 0.45λ to 0.55λ.

Figure 4C:
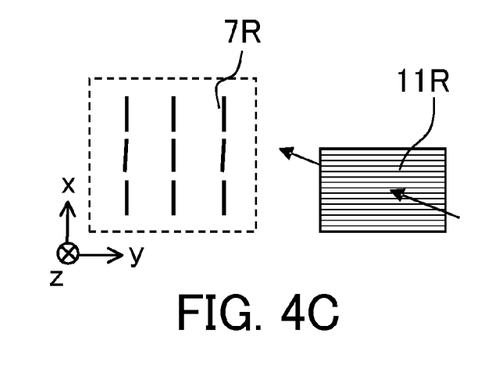
Figure 4D:
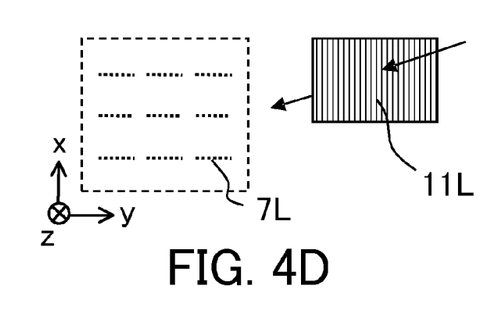

The phase difference plate 8 is provided to be able to correct the inclination of the polarizing axis in a region where the incidence angle is large as illustrated in FIG. 2B to move the image lights 7R and 7L closer to directions parallel to the x-axis direction and the y-axis direction, respectively. As a result, as illustrated in FIGS. 4C and 4D, the polarization states after the optical detection by the polarizing plates 11R and 11L are only the image lights 7R and 7L respectively, and therefore a high-quality three-dimensional image without crosstalk can be displayed.

The phase difference plate 8 of the present embodiment can be made by a method of cutting out or polishing an anisotropic crystalline material such as sapphire or a crystal so that its optic axis is inclined with respect to a surface normal. The same effect can be obtained even when a structure of holding a uniaxially-stretched or biaxially-stretched polymer film between two wedge substrates, a structure including an anisotropic film that is formed by performing a vacuum evaporation while a substrate is inclined, or a structure that is obtained by orienting liquid crystal molecules at a desired angle is used. The phase difference plate 8 of the present embodiment is not limited to the structure that is manufactured by the method described above.

Figure 5:
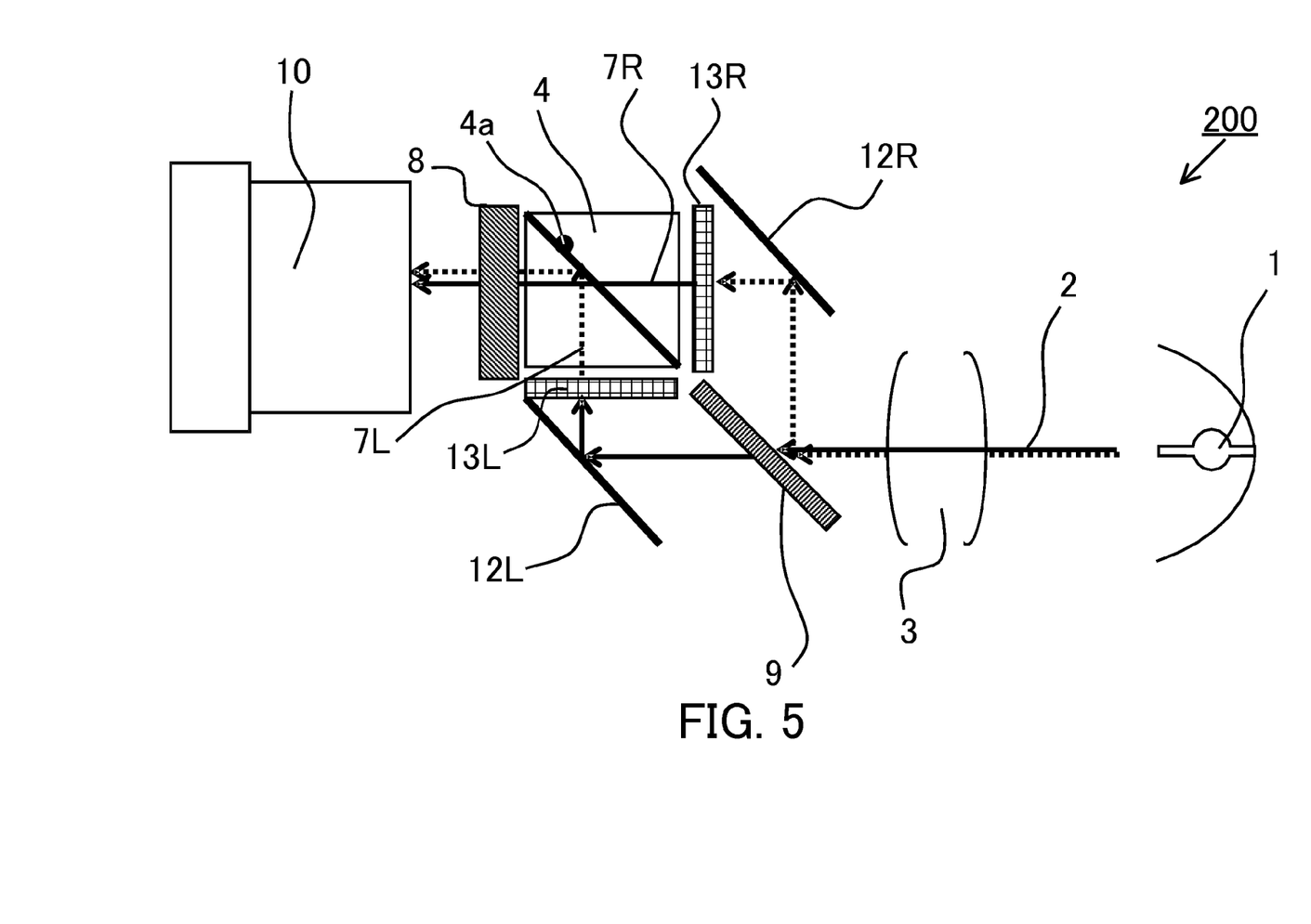
FIG. 5 is a schematic configuration diagram of an image display apparatus as another example in Embodiment 1.

As above, the projection image display apparatus 100 of the present embodiment is described, but the present embodiment is not limited to the type of the image display apparatus and the configuration of the optical system as long as the projection image display apparatus synthesizes an image using the polarization splitting element 4. For example, the present embodiment can also be applied to a projection image display apparatus 200 using a transmissive image display elements 13R and 13L as illustrated in FIG. 5. The projection image display apparatus 200 transmits or reflects two polarization components that are orthogonal to each other of illumination light in different directions using a polarization splitting element 9 to be split, and then reflects the polarization components on mirrors 12R and 12L to be introduced to the image display elements 13R and 13L, respectively. The image display elements 13R and 13L transmit incident light so as to change its polarization state in accordance with a display image. When the image lights of different polarization states are synthesized by the polarization splitting element 4, a problem occurs as described above. Even in this case, similarly to FIG. 1, the phase difference plate 8 that has the optic axis inclined with respect to the surface normal direction is disposed at an emission side of the polarization splitting element to be able to obtain the effect of the present embodiment. This is just one example and another configuration or an image display element other than that described above may also be used.

As above, the projection image display apparatus having the projection optical system 10 is described, but the effect of the present embodiment can be obtained even when the image display apparatus is configured so that the projection optical system 10 is interchangeable with a chassis. In this case, the phase difference plate 8 is disposed between the polarization splitting element 9 and the attachment portion of the projection optical system 10.

In FIG. 1, the polarization splitting surface 4a is disposed so as to be 45 degrees with respect to the z-axis direction, but the present embodiment is not limited to this. In this case, it is preferred that the phase difference plate 8 be disposed in parallel to an emission surface of the polarization splitting element 4 at the side of the projection optical system 10.

A phase difference plate other than the phase difference plate 8 may also be arbitrarily added to the optical system. For example, a phase difference plate (a second phase difference plate) that is disposed adjacent to the phase difference plate 8 and that has an optic axis facing a direction that is parallel to the surface normal is provided to be able to further reduce leakage light. This phase difference plate provides a phase difference in accordance with the incidence angle to an obliquely incident light with respect to the surface normal direction. The second phase difference plate that has a refractive index anisotropy having a positive or negative sign opposite to that of the phase difference plate 8 to correct the polarization state for each incidence angle to be able to obtain a greater effect of phase compensation in a range of a use incidence angle.

In the present embodiment, a polarization modulating element that modulates the polarization state of the image light into a different polarization state may also be arbitrarily added. As the polarization modulating element, a phase difference plate such as a quarter-wave plate that converts a state of emitted polarized light from linear polarized light into a circular polarized light or a half-wave plate that arbitrarily changes a vibration direction of the linear polarized light, or a polarization modulating member that uses a liquid crystal that temporally changes the polarization state to emit the polarized light is used. In this case, it is preferred that the polarization modulating element be disposed at an emission side relative to the phase difference plate 8. In other words, it is preferred that the polarization modulating element be disposed between the polarization splitting element 4 and the projection optical system 10 and that the phase difference plate 8 be disposed between the polarization splitting element 4 and the polarization modulating element.

In order to estimate the effect of the present embodiment, in a conventional configuration illustrated in FIG. 2A, a ratio of the image lights 7R and 7L that are synthesized by the polarization splitting element 4 and that transmit through the polarization plate 11R of FIG. 2C is calculated. It means that the image light and the noise light are split to be small crosstalk as this ratio is greater. Considering a solid angle of 1 degree, the calculation is performed for two cases where light beam that is substantially parallel to the z-axis incident (a center region) is used and an average value from each azimuth of light beam that is obliquely incident at an incidence angle of 7 degrees (an obliquely incident region) is used. In this case, in the center region, the ratio of 7R:7L is around 1500:1, which indicates a high extinction ratio. However, in the obliquely incident region, the ratio of 7R:7L is around 100:1, which indicates an extinction ratio that is lower around one digit compared to the center region. This is because an inclination amount of the polarizing axis increases in the obliquely incident region and therefore an angle shift between the polarizing axis of the emitted polarized light and the analyzing axis of the polarization plate 11R, which absorbs or reflects the polarized light that is parallel to the x-axis direction, increases.

On the other hand, in a configuration illustrated in FIG. 4A, a calculation result that is the same as above when a sapphire substrate is disposed as the phase difference plate 8 is indicated as follows. The optimal value of an angle (an acute angle) of the thickness or the optic axis of the sapphire substrate with respect to the z-axis direction depends on an incidence angle or a refractive index of a prism of the polarization splitting element. The calculation is performed on conditions that the refractive index of the prism of the polarization splitting element 4 is 1.8, the thickness of the sapphire substrate is 40 μm, and the angle of the optic axis is 62 degrees. In this case, the ratio of 7R:7L indicates around 3000:1 in the center region, and the ratio indicates around 2000:1 even in the obliquely incident region. Compared to the conventional art, the extinction ratio is improved and the effect of the present embodiment can be obtained.

As described above, according to the projection image display apparatus of the present embodiment, a high extinction ration can be maintained even in a region where the incidence angle is large. Therefore, the crosstalk of the display image can be significantly reduced without decreasing the luminance, and a high-quality three-dimensional image can be displayed.

Embodiment 2

Figure 6:
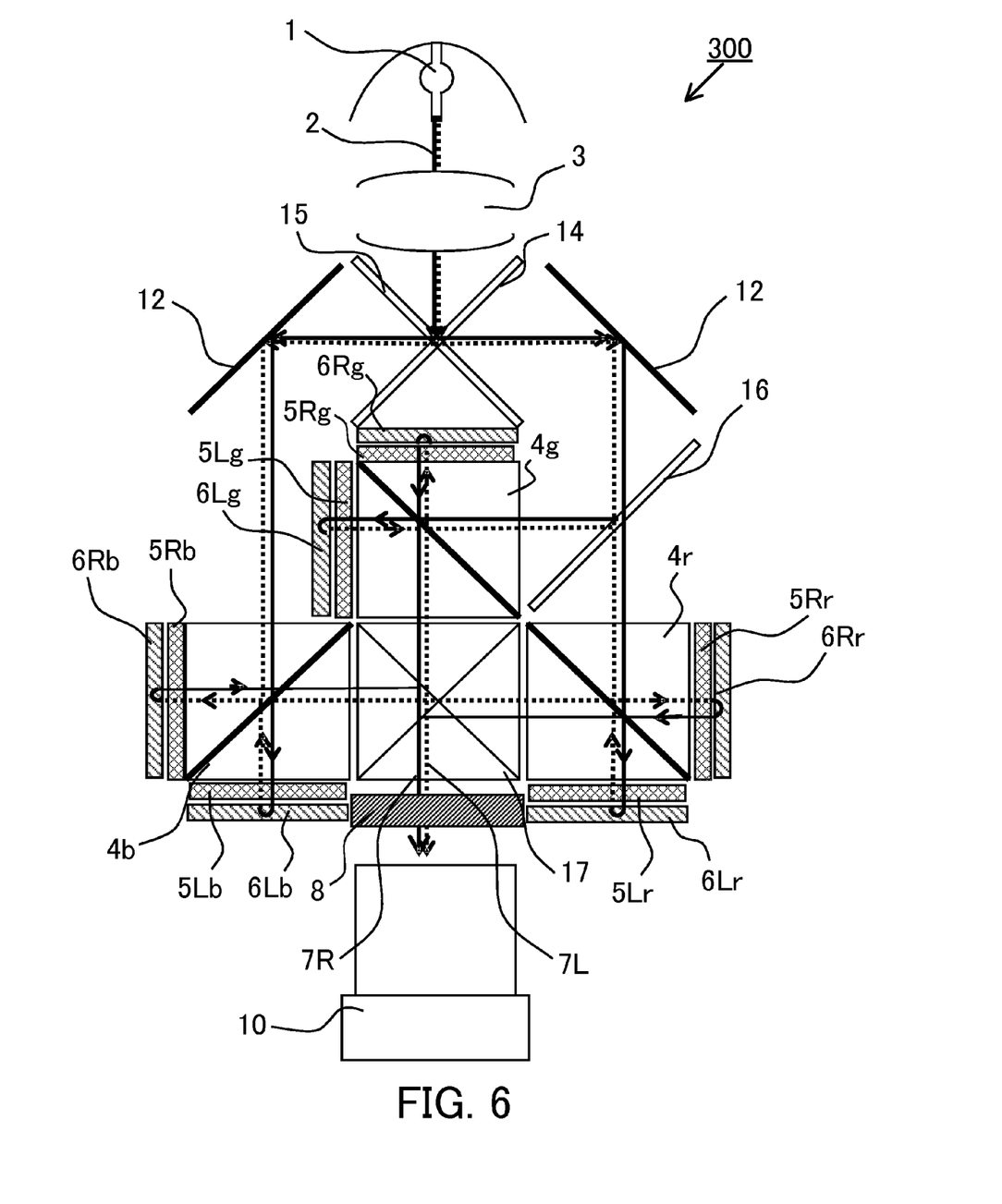
FIG. 6 is a schematic configuration diagram of an image display apparatus in Embodiment 2.

Next, a projection image display apparatus (an image display apparatus) in Embodiment 2 of the present invention will be described. FIG. 6 is a schematic configuration diagram of a projection image display apparatus 300 in the present embodiment. In the descriptions of the present embodiment, portions that are duplicates of Embodiment 1 will be omitted.

The projection image display apparatus 300 arranges illumination light 2 from a light source 1 by using an illumination optical system 3, and then splits a ray for each wavelength band of red, green, and red colors using dichroic mirrors 14, 15, and 16, and a mirror 12. Hereinafter, the blue color, the green color, and the red color are abbreviated as B, G, and R, respectively. The light split for each band is split to be two different polarized lights by polarization splitting elements 4b, 4g, and 4r that correspond to the respective bands. The polarized lights that are reflected on the polarization splitting elements 4 pass through phase difference plates 5Rb, 5Rg, and 5Rr and then enter image display elements for the right eye 6Rb, 6Rg, and 6Rr. The polarized lights that transmit through polarization splitting elements 4 pass through phase difference plates 5Lb, 5Lg, and 5Lr, and then enter image display elements for the left eye 6Lb, 6Lg, and 6Lr. Lights that are image lights obtained by changing their polarization states by the image display elements 6R and 6L (reference symbols r, g, b are omitted) enter respective polarization splitting elements again so that two image lights 7R and 7L that have different polarization states are synthesized to be emitted to a side of a synthesis prism 17. Then, image lights of B, G, and R bands are synthesized to be projected by a projection optical system 10.

In the projection image display apparatus 300 of the present embodiment, the image display elements that correspond to respective colors are used and therefore color information do not have to be temporally divided to be displayed. Accordingly, a bright and high-quality three-dimensional image can be displayed even in displaying a moving image. The polarization splitting elements 4b, 4g, and 4r only have to be operated in band widths of around 400 nm to 500 nm, 500 nm to 600 nm, and 600 nm to 700 nm, respectively, and therefore they can be easily manufactured compared to the polarization splitting element of Embodiment 1.

In the projection image display apparatus 300, the phase difference plate 8 is disposed at an emission side of the synthesis prism 17. According to such an arrangement, the shifts of the polarizing axes that are generated by the polarization splitting elements 4b, 4g, and 4r for respective bands can be compensated by one phase difference plate. Furthermore, the phase difference plate 8 that is optimized for each band may also be disposed between each of the polarization splitting elements 4b, 4g, and 4r and the synthesis prism 17.

Figure 7:
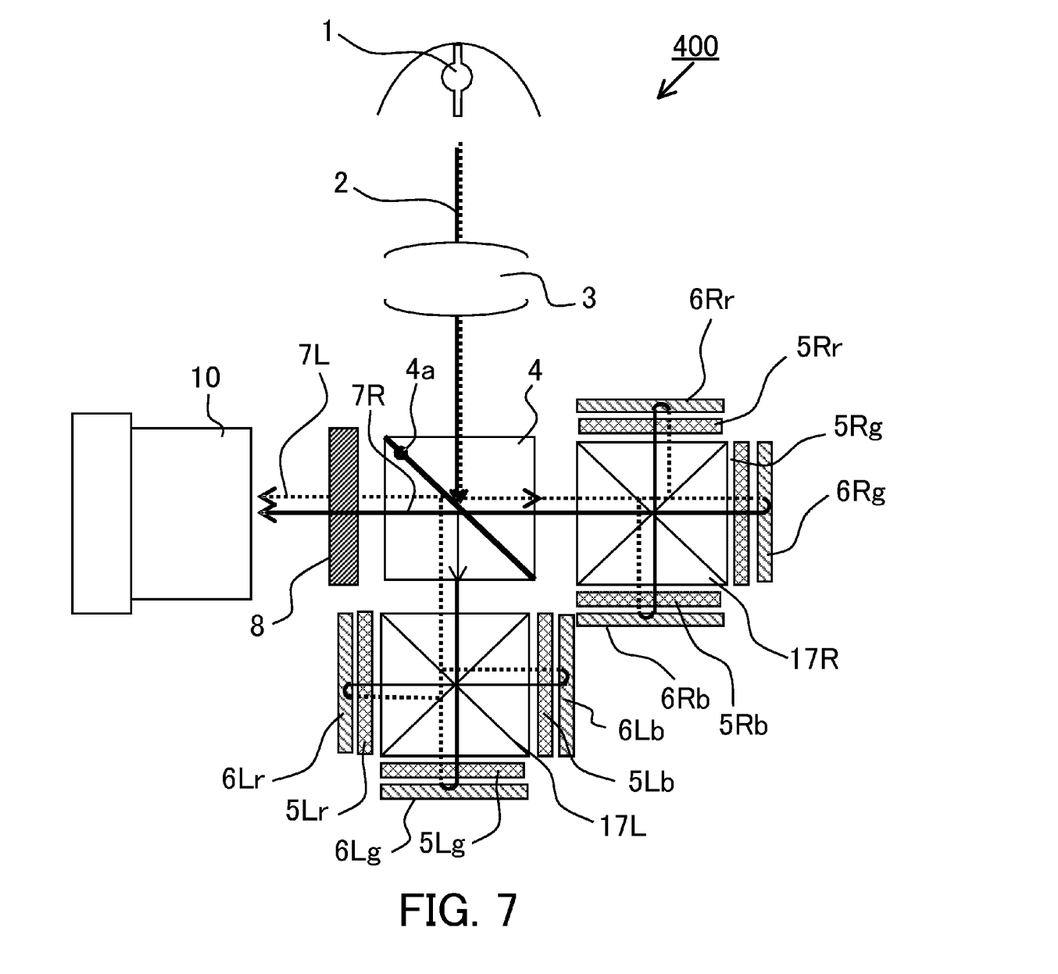
FIG. 7 is a schematic configuration diagram of an image display apparatus as another example in Embodiment 2.

As a configuration in which image display elements that correspond to respective colors, for example, a projection image display apparatus 400 as illustrated in FIG. 7 can also be adopted. The projection image display apparatus 400 is configured by including one polarization splitting element 4, two synthesis prisms 17R and 17L (cross dichroic mirrors), and six image display elements 6Rb, 6Rg, 6Rr, 6Lb, 6Lg, and 6Lr (reflective image display elements). A configuration in which transmissive image display elements or other image display elements may also be used.

Embodiment 3

Figure 8:
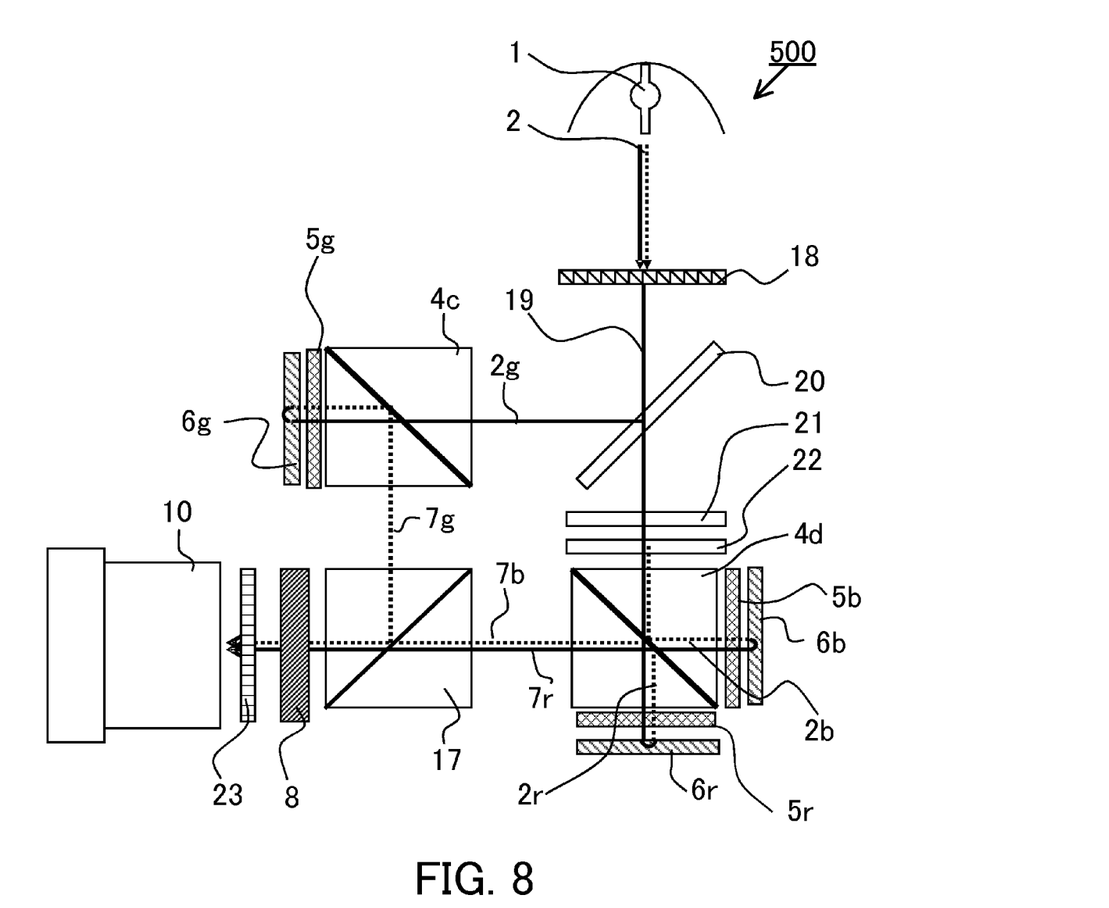
FIG. 8 is a schematic configuration diagram of an image display apparatus in Embodiment 3.

Next, a projection image display apparatus (an image display apparatus) in Embodiment 3 of the present invention will be described. FIG. 8 is a schematic configuration diagram of a projection image display apparatus 500 in the present embodiment. Portions that are duplicates of Embodiment 1 or 2 will be omitted.

In the projection image display apparatus 500 illustrated in FIG. 8, light that is emitted from a light source 1 firstly passes through a polarization converting element 18 to be adjusted to be uniform polarized light 19. Then, G-polarized light 2g is reflected on a dichroic mirror 20 that has characteristics of reflecting only a G-band, and B-polarized light 2b and R-polarized light 2r transmit through the dichroic mirror 20. The B-polarized light 2b and the R-polarized light 2r transmit through a polarization plate 21 to improve a polarization degree and then enter a wavelength-selective phase difference plate 22. The wavelength-selective phase difference plate 22 has characteristics of converting only a polarization direction of the B-polarized light by 90 degrees, and thus both the polarized lights enter a polarization splitting element 4d in a state where the polarization direction of the B-polarized light rotates by 90 degrees while the polarization state of the R-polarized light is maintained as it is.

The B-polarized light 2b is reflected on and the R-polarized light 2r transmits through the polarization splitting element 4d to perform a color separation, and then the polarized lights enter phase difference plates 5b and 5r and image display elements 6b and 6r. The G-polarized light 2g enters a polarization splitting element 4c as it is and then enters a phase difference plate 5g and an image display element 6g. Lights 7g, 7b, and 7r that are image lights obtained by changing polarization states by the image display elements 6g, 6b, and 6r enter the polarization splitting elements 4c and 4d again, and the G-polarized light 7g is reflected on, the B-polarized light 7b transmits through, and the R-polarized light 7r is reflected on the respective polarization splitting elements to be introduced to a side of a synthesis prism 17. The G image light (the G-polarized light 7g) is reflected on and the B and R image lights (the B-polarized light 7b and the R-polarized light 7r) transmit through the synthesis prism 17 to synthesize the G, B, and R image lights to be projected and imaged on a screen by a projection optical system 10.

In the embodiment, the polarization splitting element 4d is used for splitting and synthesizing the R and B image lights. The projection image display apparatus 500 of the present embodiment is different from that of Embodiments 1 and 2 in that it has only one image display element for each of three color bands and it does not use a method of synthesizing images that correspond to the right and left eyes by the polarization splitting element. However, for example two projection image display apparatus 500 is used and a projection is performed on conditions that a polarization state of image light for one apparatus orthogonal to that for the other apparatus to be overlapped on the same area to enable a user to observe a three-dimensional image by the same method as Embodiments 1 and 2. In order to change the polarization state for one apparatus, a half-wave plate or a quarter-wave plate may be arranged as an optical element 23 in front of the projection optical system 10. Thus, when the polarization splitting element 4 is used inside the optical system, the crosstalk is generated by the same problem as described above even when the synthesis method of using the two apparatuses. In particular, when a reflective image display element is used, it is highly possible that such a polarization splitting element is necessary since the incident light and the image light need to be separated from each other. In this case, the crosstalk can be reduced by disposing a phase difference plate 8 that has an inclined optic axis is disposed between the polarization splitting element 4 and the projection optical system 10.

When a polarization modulating element such as a liquid shutter that temporally switches the polarization state is disposed as the optical element 23 in front of the projection optical system 10, the three-dimensional image can be displayed by using only one apparatus. In this case, the user uses an image analyzing unit that is temporally synchronous with a timing of the modulation of the polarization state and appropriately analyzes the images entering the right and left eyes to observe the three-dimensional image. Even when this method is adopted, the correction using the phase difference plate 8 is effective because the shift of a polarizing axis is generated in performing the polarization split or the synthesis if the polarization splitting element is used inside a color separating optical system. In this case, it is preferred that the phase difference plate 8 be disposed on an optical path between the polarization modulating element as the optical element 23 and the polarization splitting element 4. When the phase difference plate 8 is disposed at a side of the projection optical system relative to the polarization modulating element, it may be possible that the correction effect is reduced by influencing the polarization modulating element.

In order to reduce the influence of a phase shift that is caused by the polarization modulating element, the arrangement of a phase difference plate having different characteristics (a second phase difference plate) combined with the phase difference plate 8 is also effective. For example, when the polarization modulating element is configured by using a liquid crystal, a phase difference plate that has anisotropy opposite to the liquid crystal and that cancel a phase difference caused by the liquid crystal in the oblique incidence is used as the second phase difference plate to be able to obtain a higher phase compensation effect. However, this is one example, and the characteristics of the second phase difference plate may be appropriately selected in accordance with the polarization modulating element. In this case, it is preferred that the second phase difference plate be disposed between the polarization modulating element and the phase difference plate 8.

According to the projection image display apparatus of each of the embodiments described above, a high-quality three-dimensional image without crosstalk can be displayed while the luminance is not damaged because the phase difference plate having an optic axis that is inclined with respect to a surface normal direction is disposed between the polarization splitting element and the projection optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the embodiments use the reflective image display element, but the embodiments are not limited to this and a transmissive image display element may also be used. In this case, a known illumination optical system may be used to illuminate the image display element by light from the light source, and the light source such as an LED may be disposed near the back side of the image display element to synthesize emitted image lights by using a PBS.

This application claims the benefit of Japanese Patent Application No. 2010-290326, filed on Dec. 27, 2010, which is hereby incorporated by reference herein in its entirety.

What is claimed is:

1. An image display apparatus comprising:
   a plurality of image display elements each configured to modulate incident light;
   a polarization splitting element having a polarization splitting surface that has characteristics of transmitting first polarized light and reflecting second polarized light whose polarizing direction is different from a polarizing direction of the first polarized light and that is configured to produce image light by combining modulated light from the plurality of image display elements and to introduce the produced image light into a projection optical system; and
   a phase difference plate that is disposed at a side of the projection optical system relative to the polarization splitting element and has an optic axis,
   wherein the optic axis is not parallel to a surface normal direction, which is a direction normal to an incidence plane of the phase difference plate, and not parallel to the incidence plane of the phase difference plate, and
   wherein the optic axis of the phase difference plate is parallel to a plane that includes a normal of the polarization splitting surface and the surface normal direction of the phase difference plate.

2. The image display apparatus according to claim 1, wherein each of the plurality of image display elements is a reflective image display element that modulates and reflects the incident light from a light source.

3. The image display apparatus according to claim 1, further comprising:
   a light source; and
   the projection optical system, which is configured to project the image light that is obtained from the plurality of image display elements via the polarization splitting element.

4. The image display apparatus according to claim 3, further comprising:
   a polarization modulating element that is disposed between the polarization splitting element and the projection optical system and that is configured to modulate a polarization state of the image light into a different polarization state,
   wherein the phase difference plate is disposed between the polarization splitting element and the polarization modulating element.

5. The image display apparatus according to claim 4, wherein the polarization modulating element is a polarization modulating element using one of a quarter-wave plate, a half-wave plate, or a liquid crystal.

6. The image display apparatus according to claim 1, wherein a main surface of the phase difference plate is disposed in parallel to an emission surface of the polarization splitting element.

7. The image display apparatus according to claim 1, wherein the polarization splitting element is a polarizing beam splitter that transmits or reflects at least one of P-polarized light or S-polarized light.

8. The image display apparatus according to claim 1, wherein the phase difference plate is configured so that a phase difference $\Delta n \cdot d$ that is a product of a difference $\Delta n$ of refractive index anisotropy of the phase difference plate and a thickness d of an anisotropic medium of the phase difference plate is in a range from $0.35\lambda$ to $0.65\lambda$, where $\lambda$ is a center wavelength of a wavelength band of light that transmits through the phase difference plate.

9. The image display apparatus according to claim 1, wherein an angle between the optic axis and the surface normal direction of the phase difference plate is in a range of 55 degrees to 75 degrees.

10. The image display apparatus according to claim 1, further comprising a second phase difference plate that is disposed adjacent to the phase difference plate and that has a second optic axis in a direction parallel to the surface normal direction.

11. The image display apparatus according to claim 10, wherein the second phase difference plate has refractive index anisotropy that has one of a positive sign or a negative sign opposite to refractive index anisotropy of the phase difference plate.

12. The image display apparatus according to claim 1, further comprising:
    an attachment portion configured to attach the projection optical system that projects the image light obtained from the plurality of image display elements via the polarization splitting element,
    wherein the phase difference plate is disposed between the polarization splitting element and the attachment portion.

* * * * *